United States Patent
Ramakrishnan et al.

(10) Patent No.: US 10,370,110 B2
(45) Date of Patent: Aug. 6, 2019

(54) AIRCRAFT HAVING AN AFT ENGINE

(71) Applicant: General Electric Company, Schenectady, NY (US)

(72) Inventors: Kishore Ramakrishnan, Rexford, NY (US); Jixian Yao, Niskayuna, NY (US); Nikolai N. Pastouchenko, Glenville, NY (US); Ivan Malcevic, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 263 days.

(21) Appl. No.: 15/271,776

(22) Filed: Sep. 21, 2016

(65) Prior Publication Data

US 2018/0079514 A1   Mar. 22, 2018

(51) Int. Cl.
*B64D 27/14*   (2006.01)
*B64C 5/06*   (2006.01)
(Continued)

(52) U.S. Cl.
CPC ............... *B64D 27/14* (2013.01); *B64C 1/16* (2013.01); *B64C 5/06* (2013.01); *B64C 21/00* (2013.01);
(Continued)

(58) Field of Classification Search
CPC ........ B64D 27/14; B64D 27/20; B64C 21/00; B64C 21/06; B64C 21/10;
(Continued)

(56) References Cited

U.S. PATENT DOCUMENTS

| 2,557,522 A | 6/1951 | Vautier |
| 4,311,289 A | 1/1982 | Finch |

(Continued)

FOREIGN PATENT DOCUMENTS

| EP | 0737616 B1 | 2/1998 |
| EP | 1550606 A2 | 7/2005 |

(Continued)

OTHER PUBLICATIONS

Liou et al., "Minimizing Inlet Distortion for Hybrid Wing Body Aircraft", Journal of Turbomachinery, vol. 134, Issue 3, 10 Pages, Jul. 15, 2011.

(Continued)

*Primary Examiner* — Christopher P Ellis
(74) *Attorney, Agent, or Firm* — Dority & Manning, P.A.

(57) ABSTRACT

An aircraft is provided including a fuselage that extends along a longitudinal direction between a forward end and an aft end. A boundary layer ingestion fan is mounted to the fuselage at the aft end and is configured for ingesting boundary layer airflow off the surface of the fuselage. The fuselage defines a profile proximate the boundary layer ingestion fan that is optimized for ingesting a maximum amount of boundary layer air and improving propulsive efficiency of the aircraft. More specifically, the fuselage defines a cross sectional profile upstream of the boundary layer ingestion fan that has more cross sectional area in a top half relative to a bottom half as defined relative to a centerline of the boundary layer ingestion fan.

17 Claims, 5 Drawing Sheets

(51) Int. Cl.
*B64C 21/00* (2006.01)
*B64C 1/16* (2006.01)
*B64D 27/20* (2006.01)
*B64C 21/08* (2006.01)
*B64C 1/00* (2006.01)

(52) U.S. Cl.
CPC .............. *B64C 21/08* (2013.01); *B64D 27/20* (2013.01); *B64C 2001/0045* (2013.01); *B64C 2230/04* (2013.01); *Y02T 50/12* (2013.01); *Y02T 50/166* (2013.01)

(58) Field of Classification Search
CPC ......... B64C 2001/0045; B64C 2330/04; Y02T 50/12; Y02T 50/166
See application file for complete search history.

(56) References Cited

U.S. PATENT DOCUMENTS

| | | | |
|---|---|---|---|
| 4,736,913 A | 4/1988 | Bennett et al. | |
| 4,749,151 A | 6/1988 | Ball et al. | |
| 4,828,204 A * | 5/1989 | Friebel | B64C 1/0009 244/117 R |
| 4,953,812 A | 9/1990 | Van Der Hoeven | |
| 5,115,996 A | 5/1992 | Moller | |
| 5,417,391 A | 5/1995 | Savitsky et al. | |
| 5,692,704 A | 12/1997 | Buttgereit et al. | |
| 5,769,358 A * | 6/1998 | Hahl | B64C 1/0009 244/120 |
| 5,779,189 A | 7/1998 | Hamstra et al. | |
| 5,957,405 A | 9/1999 | Williams | |
| 6,129,306 A | 10/2000 | Pham | |
| 6,149,101 A | 11/2000 | Tracy | |
| 7,309,046 B2 | 12/2007 | Makino | |
| 7,614,588 B2 | 11/2009 | Birkenstock | |
| 7,818,958 B2 | 10/2010 | Bulin et al. | |
| 7,861,968 B2 | 1/2011 | Parikh et al. | |
| 8,783,617 B2 * | 7/2014 | Harbeck | B64C 1/0009 244/13 |
| 9,120,552 B2 | 9/2015 | Kreshchishina et al. | |
| 2010/0200698 A1 | 8/2010 | Kreshchishin et al. | |
| 2015/0122952 A1 * | 5/2015 | Florea | B64D 27/20 244/53 B |
| 2015/0291285 A1 | 10/2015 | Gallet | |
| 2017/0081036 A1 * | 3/2017 | Marrinan | B64C 1/16 |
| 2017/0081037 A1 * | 3/2017 | Marrinan | B64D 29/04 |
| 2018/0079514 A1 * | 3/2018 | Ramakrishnan | B64D 27/14 |
| 2018/0086436 A1 * | 3/2018 | Pastouchenko | B64C 5/02 |
| 2018/0086437 A1 | 3/2018 | Pastouchenko et al. | |
| 2018/0086438 A1 | 3/2018 | Pastouchenko et al. | |
| 2018/0134406 A1 * | 5/2018 | Reckzeh | B64D 27/20 |
| 2018/0170563 A1 * | 6/2018 | Bouchet | B64C 1/061 |
| 2018/0208322 A1 * | 7/2018 | Tantot | B64D 27/14 |
| 2019/0048904 A1 * | 2/2019 | Neiser | B64C 29/0025 |

FOREIGN PATENT DOCUMENTS

| | | | | |
|---|---|---|---|---|
| EP | 3326910 A1 * | 5/2018 | | B64C 1/0009 |
| EP | 3339166 A1 * | 6/2018 | | B64C 1/0009 |
| FR | 2794718 A1 | 12/2000 | | |
| GB | 1024894 A | 4/1966 | | |
| GB | 1032274 A | 6/1966 | | |
| WO | 2004/108528 A2 | 12/2004 | | |
| WO | 2010/022362 A2 | 2/2010 | | |
| WO | 2011129721 A1 | 10/2011 | | |

OTHER PUBLICATIONS

Guy Norris, "Boundary-Layer Ingestion Key to MIT/NASA D8 Hopes", Aviation Week & Space Technology, Sep. 30, 2013.
Sharma A., "Design of Inlet for Boundary Layer Ingestion in a Blended Wing Body Aircraft", TU Delft, Jan. 29, 2015.
International Search Report and Written Opinion issued in connection with corresponding PCT Application No. PCT/US2017/048531 dated Nov. 27, 2017.

\* cited by examiner

AIRCRAFT HAVING AN AFT ENGINE

FIELD OF THE INVENTION

The present subject matter relates generally to an aircraft having an aft engine, or more particularly to a fuselage of an aircraft designed to increase the efficiency of the aft engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines also affects the net propulsive thrust of the aircraft. A total amount of drag on the aircraft, including skin friction and form drag, is generally proportional to a difference between a freestream velocity of air approaching the aircraft and an average velocity of a wake downstream from the aircraft that is produced due to the drag on the aircraft.

Positioning a fan at an aft end of the fuselage of the aircraft may assist with reenergizing a boundary layer airflow over the aft end of the fuselage and improving propulsive efficiency. However, given existing structures at the aft end of the fuselage, such as one or more stabilizers, the airflow ingested by such a fan may not have a uniform velocity or total pressure profile along the circumferential and radial directions of the fan. More specifically, the structures at the aft end of the fuselage may generate a boundary layer or wake resulting in swirl distortion and a distorted velocity or total pressure profile of the airflow ingested by the fan.

Accordingly, an aircraft capable of energizing slow-moving air forming a boundary layer across the fuselage of the aircraft would be useful. Specifically, a fuselage of an aircraft designed to increase the ingestion of relatively low momentum boundary layer airflow into the aft engine and reduce the non-uniformity and distortion of the velocity profile of ingested airflow would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an aircraft defining a longitudinal direction, a vertical direction, and a lateral direction is provided. The aircraft includes a fuselage extending between a forward end and an aft end along the longitudinal direction. The aircraft also includes a boundary layer ingestion fan mounted to the fuselage at the aft end of the fuselage, the boundary layer ingestion fan defining a centerline and including a plurality of fan blades rotatable about the centerline and a nacelle surrounding the plurality of fan blades. The fuselage defines a cross section upstream of the boundary layer ingestion fan, the cross section defining a horizontal reference line extending through the centerline of the boundary layer ingestion fan to define a top half having a top half cross sectional area and a bottom half having a bottom half cross sectional area. The top half cross sectional area of the cross section is greater than the bottom half cross sectional area of the cross section.

In another exemplary embodiment of the present disclosure, an aircraft defining a longitudinal direction, a vertical direction, and a lateral direction is provided. The aircraft includes a fuselage extending between a forward end and an aft end along the longitudinal direction, the fuselage defining a top surface and a bottom surface. The aircraft also includes a boundary layer ingestion fan mounted to the fuselage at the aft end of the fuselage, the boundary layer ingestion fan defining a centerline and including a plurality of fan blades rotatable about the centerline and a nacelle surrounding the plurality of fan blades. The fuselage defines a cross section upstream of the boundary layer ingestion fan, the cross section defining a circumference and a horizontal reference line, wherein the horizontal reference line extends across a widest portion of the cross section along the lateral direction, the fuselage further defining a reference circle at the cross section and having the horizontal reference line as a diameter of the reference circle. At least a portion of the circumference of a top half of the cross section of the fuselage is located outside the reference circle, and wherein at least a portion of the circumference of a bottom half of the cross section of the fuselage is located inside the reference circle.

In yet another exemplary embodiment of the present disclosure, an aircraft defining a longitudinal direction, a vertical direction, and a lateral direction is provided. The aircraft includes a fuselage extending between a forward end and an aft end along the longitudinal direction, the fuselage defining a surface. A boundary layer ingestion fan is mounted to the fuselage at the aft end of the fuselage, the boundary layer ingestion fan defining a centerline and including a plurality of fan blades rotatable about the centerline and a nacelle surrounding the plurality of fan blades. A stabilizer is attached to the fuselage and extending between a leading edge and a trailing edge. The surface of the fuselage defines a first point located in a plane perpendicular to the longitudinal direction and positioned where the leading edge of the stabilizer meets the fuselage, a second point located in a plane perpendicular to the longitudinal direction and positioned where the trailing edge of the stabilizer meets the fuselage, and an inflection point. The surface of the fuselage further defines a first portion of the surface, the first portion extending between the first point and the inflection point, the first portion being convex; and a second portion of the surface, the second portion extending between the inflection point and the second point, the second portion being concave.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
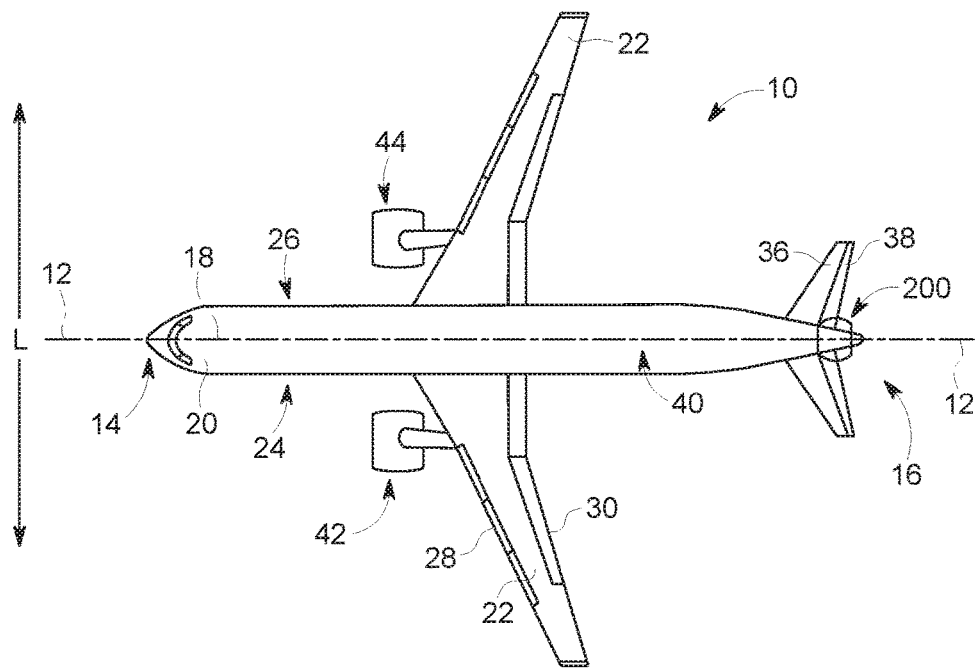
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
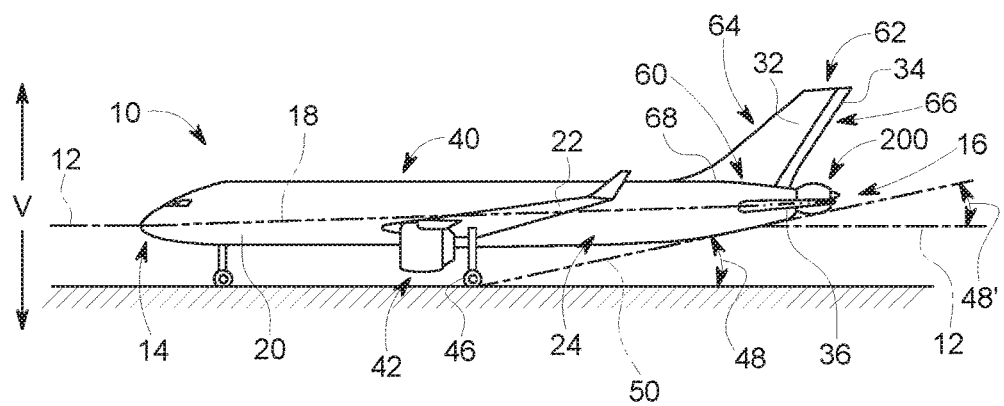
FIG. 2 is a port side view of the exemplary aircraft of FIG. 1.

Referring now to the drawings, wherein identical numerals indicate the same elements throughout the figures, FIG. 1 provides a top view of an exemplary aircraft 10 as may incorporate various embodiments of the present invention. FIG. 2 provides a port side 24 view of the aircraft 10 as illustrated in FIG. 1. As shown in FIGS. 1 and 2 collectively, the aircraft 10 defines a longitudinal direction 12 that extends therethrough, a vertical direction V, a lateral direction L, a forward end 14, and an aft end 16. Moreover, the aircraft 10 defines a mean line 18 extending between the forward end 14 and aft end 16 of the aircraft 10. As used herein, the "mean line" refers to a midpoint line extending along a length of the aircraft 10, not taking into account the appendages of the aircraft 10 (such as the wings 22 and stabilizers discussed below).

Moreover, the aircraft 10 includes a fuselage 20, extending longitudinally from the forward end 14 of the aircraft 10 towards the aft end 16 of the aircraft 10, and a pair of wings 22. As used herein, the term "fuselage" generally includes all of the body of the aircraft 10, such as an empennage of the aircraft 10 and an outer surface or skin of the aircraft 10.

The first of such wings 22 extends laterally outwardly with respect to the longitudinal direction 12 from the port side 24 of the fuselage 20 and the second of such wings 22 extends laterally outwardly with respect to the longitudinal direction 12 from a starboard side 26 of the fuselage 20. Each of the wings 22 for the exemplary embodiment depicted includes one or more leading edge flaps 28 and one or more trailing edge flaps 30. The aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40.

As illustrated, each stabilizer extends between a root portion and a tip portion substantially within a single plane. For example, as illustrated in FIGS. 1 and 2, vertical stabilizer 32 defines a root portion 60 and a tip portion 62 separated along the vertical direction V. In addition, vertical stabilizer 32 extends between a leading edge 64 and a trailing edge 66 along the longitudinal direction 12. As illustrated, vertical stabilizer 32 is mounted to fuselage 20 at root portion 60 and extends substantially along the vertical direction V to tip portion 62. In this manner, a junction line 68 is defined at the intersection of vertical stabilizer 32 and fuselage 20. More specifically, junction line 68 extends between leading edge 64 and trailing edge 66 of vertical stabilizer 32. However, it should be appreciated that in other exemplary embodiments of the present disclosure, the aircraft 10 may additionally or alternatively include any other suitable configuration of stabilizers that may or may not extend directly along the vertical direction V or horizontal/lateral direction L. In addition, alternative stabilizers may be any suitable shape, size, configuration, or orientation while remaining within the scope of the present subject matter.

The exemplary aircraft 10 of FIGS. 1 and 2 also includes a propulsion system. The exemplary propulsion system includes a plurality of aircraft engines, at least one of which mounted to each of the pair of wings 22. Specifically, the plurality of aircraft engines includes a first aircraft engine 42 mounted to a first wing of the pair of wings 22 and a second aircraft engine 44 mounted to a second wing of the pair of wings 22. In at least certain exemplary embodiments, the aircraft engines 42, 44 may be configured as turbofan jet engines suspended beneath the wings 22 in an under-wing configuration. For example, in at least certain exemplary embodiments, the first and/or second aircraft engines 42, 44 may be configured in substantially the same manner as the exemplary turbofan jet engine 100 described below with reference to FIG. 3. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc.

Additionally, the propulsion system includes an aft engine 200 mounted to the fuselage 20 of the aircraft 10 proximate the aft end 16 of the aircraft 10, or more particularly at a location aft of the wings 22 and aircraft engines 42, 44. The exemplary aft engine 200 is mounted to the fuselage 20 of the aircraft 10 such that the mean line 18 extends therethrough. The aft engine 200, which is generally configured as an engine that ingests and consumes air forming a boundary layer over fuselage 20, will be discussed in greater detail below with reference to FIGS. 4 through 8.

Referring specifically to FIG. 2, the aircraft 10 additionally includes landing gear, such as wheels 46, extending from a bottom side of the fuselage 20 and from a bottom side of the wings 22. The fuselage 20 is designed to allow the aircraft 10 to takeoff and/or land at a takeoff angle 48 with the ground without the aft end 16 scraping the ground. More specifically, takeoff angle 48 may be defined as the angle between the ground (parallel to longitudinal direction 12) and a takeoff plane 50. As will be discussed below, the exemplary fuselage 20 and aft engine 200 described herein are designed to allow the aircraft 10 to maintain a desired takeoff angle 48, despite the addition of the aft engine 200 proximate the aft end 16 of the aircraft 10. Notably, for the embodiment depicted, the longitudinal direction 12 of the aircraft 10 is parallel to the ground when the aircraft 10 is on the ground. Accordingly, the maximum takeoff angle 48, as shown, may alternatively be defined with the longitudinal direction 12 of the aircraft 10 (shown as angle 48' in FIG. 2).

Figure 3:
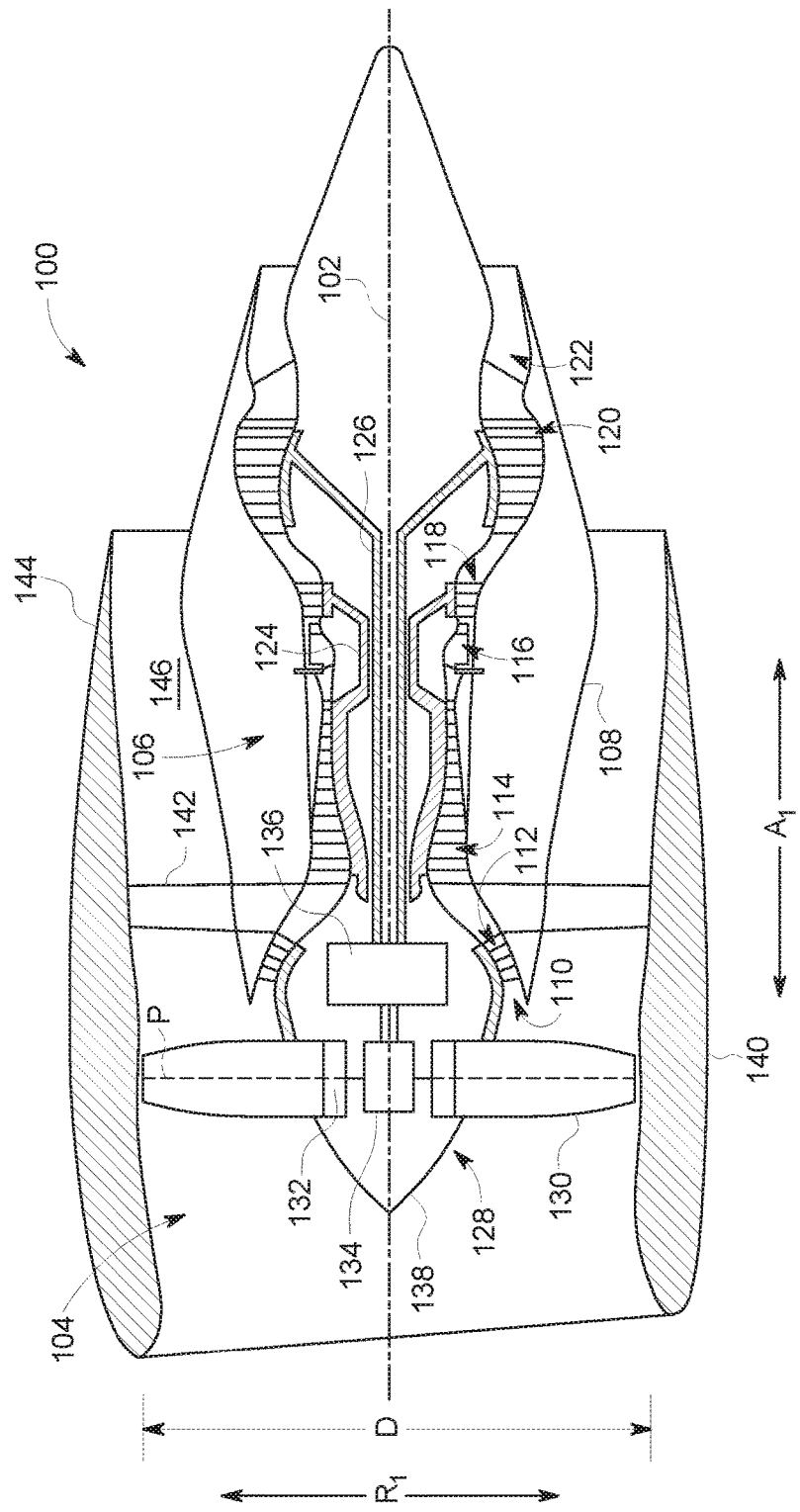
FIG. 3 is a schematic, cross-sectional view of a gas turbine engine in accordance with an exemplary embodiment of the present disclosure.

Referring now to FIG. 3, a schematic, cross-sectional view of an exemplary aircraft engine is provided. Specifically, for the embodiment depicted, the aircraft engine is configured as a high bypass turbofan jet engine, referred to herein as "turbofan engine 100." As discussed above, one or both of the first and/or second aircraft engines 42, 44 of the exemplary aircraft 10 described in FIGS. 1 and 2 may be configured in substantially the same manner as the exemplary turbofan engine 100 of FIG. 3. Alternatively, however, in other exemplary embodiments, one or both of aircraft engines 42, 44 may be configured as any other suitable engines, such as a turboshaft, turboprop, turbojet, etc.

As shown in FIG. 3, the turbofan engine 100 defines an axial direction $A_1$ (extending parallel to a longitudinal centerline 102 provided for reference) and a radial direction $R_1$. In general, the turbofan 10 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section including a booster or low pressure (LP) compressor 112 and a high pressure (HP) compressor 114; a combustion section 116; a turbine section including a high pressure (HP) turbine 118 and a low pressure (LP) turbine 120; and a jet exhaust nozzle section 122. A high pressure (HP) shaft or spool 124 drivingly connects the HP turbine 118 to the HP compressor 114. A low pressure (LP) shaft or spool 126 drivingly connects the LP turbine 120 to the LP compressor 112. The compressor section, combustion section 116, turbine section, and nozzle section 122 together define a core air flowpath.

For the embodiment depicted, the fan section 104 includes a variable pitch fan 128 having a plurality of fan blades 130 coupled to a disk 132 in a spaced apart manner. As depicted, the fan blades 130 extend outwardly from disk 132 generally along the radial direction $R_1$ and define a fan diameter D. Each fan blade 130 is rotatable relative to the disk 132 about a pitch axis P by virtue of the fan blades 130 being operatively coupled to a suitable actuation member 134 configured to collectively vary the pitch of the fan blades 130 in unison. The fan blades 130, disk 132, and actuation member 134 are together rotatable about the longitudinal direction 12 by LP shaft 126 across a power gear box 136. The power gear box 136 includes a plurality of gears for adjusting the rotational speed of the fan 128 relative to the LP shaft 126 to a more efficient rotational fan speed.

Referring still to the exemplary embodiment of FIG. 3, the disk 132 is covered by rotatable front hub 138 aerodynamically contoured to promote an airflow through the plurality of fan blades 130. Additionally, the exemplary fan section 104 includes an annular fan casing or outer nacelle 140 that circumferentially surrounds the fan 128 and/or at least a portion of the core turbine engine 106. It should be appreciated that the nacelle 140 may be configured to be supported relative to the core turbine engine 106 by a plurality of circumferentially-spaced outlet guide vanes 142. Moreover, a downstream section 144 of the nacelle 140 may extend over an outer portion of the core turbine engine 106 so as to define a bypass airflow passage 146 therebetween.

It should be appreciated, however, that the exemplary turbofan engine 100 depicted in FIG. 3 is by way of example only, and that in other exemplary embodiments, the turbofan engine 100 may have any other suitable configuration, including, e.g., any suitable number of shafts or spools, compressors, and/or turbines.

Figure 4:
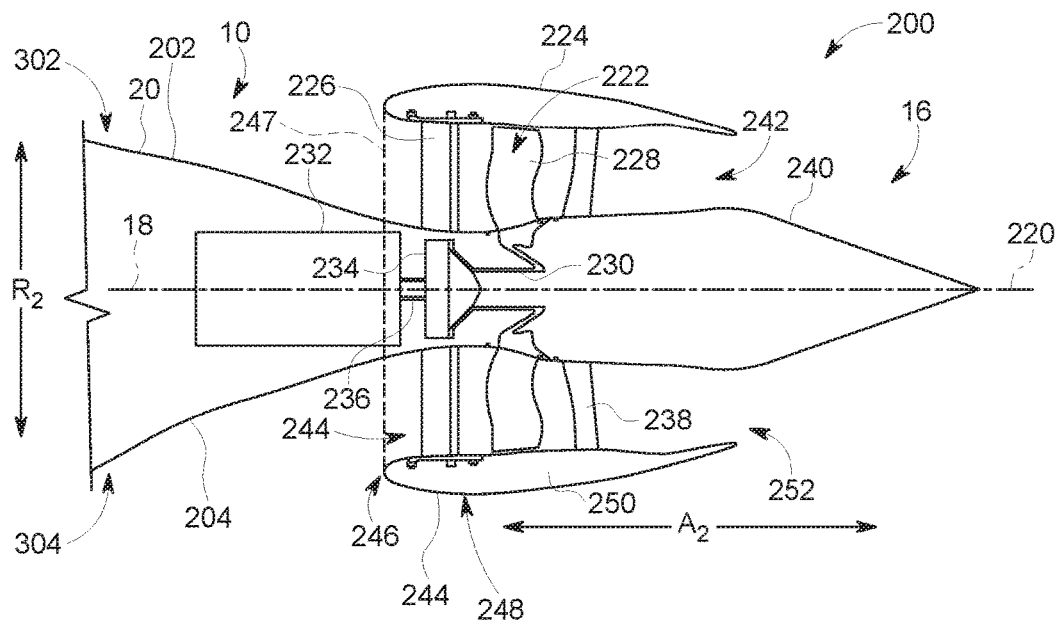
FIG. 4 is a schematic, cross-sectional view of an aft engine mounted to an aft end of the exemplary aircraft of FIG. 1 in accordance with an exemplary embodiment of the present disclosure.

Referring now also to FIG. 4, a close-up, schematic, cross-sectional view of the exemplary aft engine 200 of FIGS. 1 and 2 is provided. As discussed, the exemplary aft engine 200 is mounted to the fuselage 20 proximate the aft end 16 of the aircraft 10. The aft engine 200 depicted defines an axial direction $A_2$ extending along a longitudinal centerline axis 220 that extends therethrough for reference, a radial direction $R_2$, and a circumferential direction $C_2$ (see FIG. 7).

Additionally, for the embodiment depicted, the aft engine 200 is configured as a boundary layer ingestion engine configured to ingest and consume air forming a boundary layer over the fuselage 20 of the aircraft 10. The aft engine 200 includes a fan 222 rotatable about the centerline axis 220, a nacelle 224 extending around a portion of the fan 222, and one or more structural members 226 extending between the nacelle 224 and the fuselage 20 of the aircraft 10. The fan 222 includes a plurality of fan blades 228 spaced generally along circumferential direction $C_2$. Additionally, the nacelle 224 extends around and encircles the plurality of fan blades 228 and a portion of the fuselage 20. Specifically, the nacelle 224 extends around at least a portion of the fuselage 20 of the aircraft 10 when, as in FIG. 4, the aft engine 200 is mounted to the aircraft 10.

As is also depicted in FIG. 4, the fan 222 further includes a fan shaft 230 with the plurality of fan blades 228 attached thereto. Although not depicted, the fan shaft 230 may be rotatably supported by one or more bearings located forward of the plurality of fan blades 228 and, optionally, one or more bearings located aft of the plurality of fan blades 228. Such bearings may be any suitable combination of roller bearings, ball bearings, thrust bearings, etc.

In certain exemplary embodiments, the plurality of fan blades 228 may be attached in a fixed manner to the fan shaft 230, or alternatively, the plurality of fan blades 228 may be rotatably attached to the fan shaft 230. For example, the plurality of fan blades 228 may be attached to the fan shaft 230 such that a pitch of each of the plurality of fan blades 228 may be changed, e.g., in unison, by a pitch change mechanism (not shown).

The fan shaft 230 is mechanically coupled to a power source 232 located at least partially within the fuselage 20 of the aircraft 10. For the embodiment depicted, the fan shaft 230 is mechanically coupled to the power source 232 through a gearbox 234. The gearbox 234 may be configured to modify a rotational speed of the power source 232, or rather of a shaft 236 of the power source 232, such that the fan 222 of the aft engine 200 rotates at a desired rotational speed. The gearbox 234 may be a fixed ratio gearbox, or alternatively, the gearbox 234 may define a variable gear ratio.

The power source 232 may be any suitable power source. For example, in certain exemplary embodiments the power source 232 may be an electric power source (e.g., the aft engine 200 may be configured as part of a gas-electric propulsion system with the first and/or second aircraft engines 42, 44). However, in other exemplary embodiments, the power source 232 may alternatively be configured as a dedicated gas engine, such as a gas turbine engine. Moreover, in certain exemplary embodiments, the power source 232 may be positioned at any other suitable location within, e.g., the fuselage 20 of the aircraft 10 or the aft engine 200. For example, in certain exemplary embodiments, the power source 232 may be configured as a gas turbine engine positioned at least partially within the aft engine 200.

Referring still to FIG. 4, the one or more structural members 226 extend between the nacelle 224 and the fuselage 20 of the aircraft 10 at a location forward of the plurality of fan blades 228. The one or more structural members 226 for the embodiment depicted extend substantially along the radial direction $R_2$ between the nacelle 224 and the fuselage 20 of the aircraft 10 for mounting the aft engine 200 to the fuselage 20 of the aircraft 10. It should also be appreciated, however, that in other exemplary embodiments the one or more structural members 226 may instead extend substantially along the axial direction $A_2$, or in any other suitable direction between the axial and radial directions $A_2$, $R_2$. It should be appreciated, that as used herein, terms of approximation, such as "approximately," "substantially," or "about," refer to being within a ten percent margin of error.

The one or more structural members 226 depicted are configured as inlet guide vanes for the fan 222, such that the one or more structural members 226 are shaped and oriented to direct and condition a flow of air into the aft engine 200 to increase an efficiency of the aft engine 200. In certain exemplary embodiments, the one or more structural members 226 may be configured as fixed inlet guide vanes extending between the nacelle 224 and the fuselage 20 of the aircraft 10, or alternatively the one or more structural members 226 may be configured as variable inlet guide vanes.

Moreover, the aft engine 200 includes one or more outlet guide vanes 238 and a tail cone 240. The one or more outlet guide vanes 238 for the embodiment depicted extend between the nacelle 224 and the tail cone 240 for, e.g., adding strength and rigidity to the aft engine 200, as well as for directing a flow of air through the aft engine 200. The outlet guide vanes 238 may be evenly spaced along the circumferential direction $C_2$ (see FIG. 7), or may have any other suitable spacing. Additionally, the outlet guide vanes 238 may be fixed outlet guide vanes, or alternatively may be variable outlet guide vanes.

Aft of the plurality of fan blades 228, and for the embodiment depicted, aft of the one or more outlet guide vanes 238, the aft engine 200 additionally defines a nozzle 242 between the nacelle 224 and the tail cone 240. The nozzle 242 may be configured to generate an amount of thrust from the air flowing therethrough, and the tail cone 240 may be shaped to minimize an amount of drag on the aft engine 200. However, in other embodiments, the tail cone 240 may have any other shape and may, e.g., end forward of an aft end of the nacelle 224 such that the tail cone 240 is enclosed by the nacelle 224 at an aft end. Additionally, in other embodiments, the aft engine 200 may not be configured to generate any measurable amount of thrust, and instead may be configured to ingest air from a boundary layer of air of the fuselage 20 of the aircraft 10 and add energy/speed up such air to reduce an overall drag on the aircraft 10 (and thus increase a net thrust of the aircraft 10).

Referring still to FIG. 4, the aft engine 200, or rather the nacelle 224, defines an inlet 244 at a forward end 246 of the nacelle 224. The inlet 244 is defined by the nacelle 224 with the fuselage 20, i.e., between the nacelle 224 and the fuselage 20. As mentioned above, the nacelle 224 of the aft engine 200 extends around and surrounds the plurality of fan blades 228 of the fan 222 of the aft engine 200. For the embodiment depicted, nacelle 224 also extends at least partially around the central axis 220 of the aft engine 200, and at least partially around the mean line 18 of the aircraft 10. Specifically, for the embodiment depicted, the nacelle 224 extends substantially three hundred and sixty degrees (360°) around the central axis 220 of the aft engine 200, and substantially three hundred and sixty degrees (360°) around the mean line 18 of the aircraft 10.

Notably, by positioning the aft engine 200 such that the nacelle 224 of the aft engine 200 extends at least partially around the fuselage 20 proximate the aft end 16 of the aircraft 10, a bottom portion 248 of the nacelle 224 may not interfere with, e.g., the takeoff angle 48 of the aircraft 10 (see FIG. 2). For example, as shown, the nacelle 224 of the aft engine 200 includes at least a portion located inward of the takeoff plane 50 defined by the fuselage 20 (see FIG. 2). Particularly for the embodiment depicted, an entirety of the bottom portion 248 of the nacelle 224 is positioned in-line with, or inwardly of the takeoff plane 50 of the fuselage 20. For at least certain prior art aircrafts, the takeoff plane 50 of the fuselage 20 indicates the conventional shape for a bottom portion of a fuselage at an aft end of an aircraft.

Figure 5:
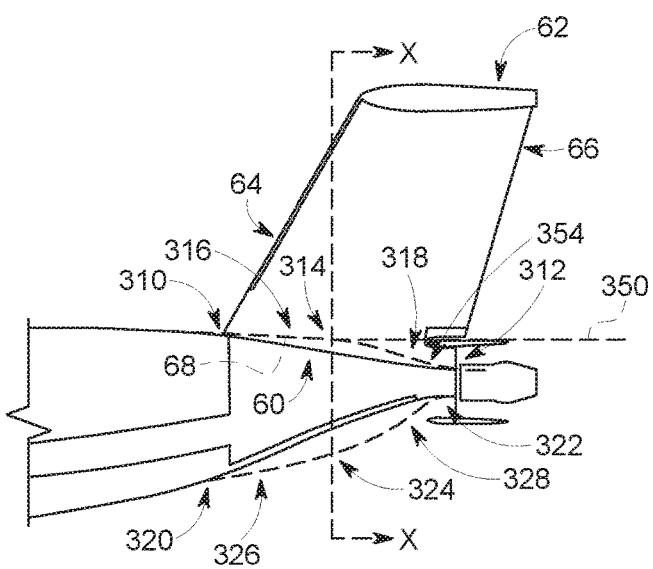
FIG. 5 provides another schematic, cross-sectional side view of an aft engine mounted to an aft end of the exemplary aircraft of FIG. 1 in accordance with an exemplary embodiment of the present disclosure.
Figure 6:
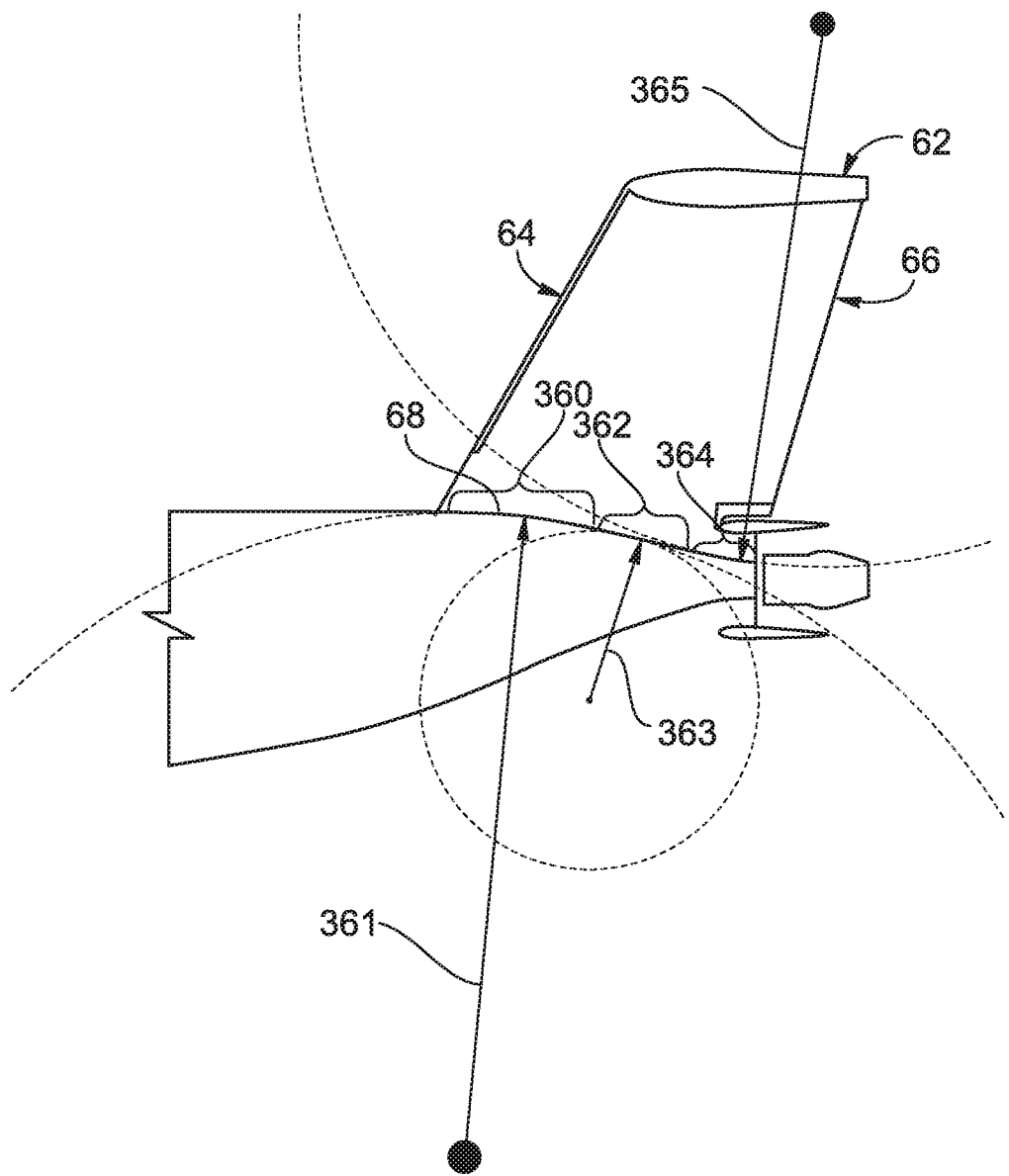
FIG. 6 provides another schematic, cross-sectional side view of an aft engine mounted to an aft end of the exemplary aircraft of FIG. 1 in accordance with an exemplary embodiment of the present disclosure.
Figure 7:
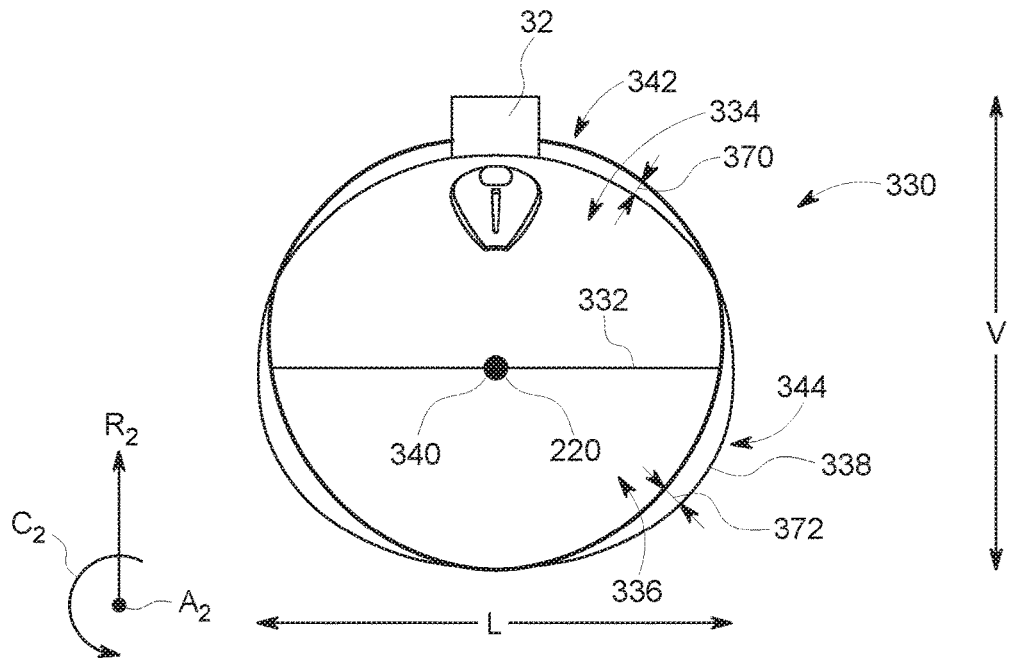
FIG. 7 provides a schematic cross-sectional view of the fuselage of the exemplary aircraft of FIG. 1, as taken along Line X-X of FIG. 5 according to an exemplary embodiment of the present subject matter.
Figure 8:
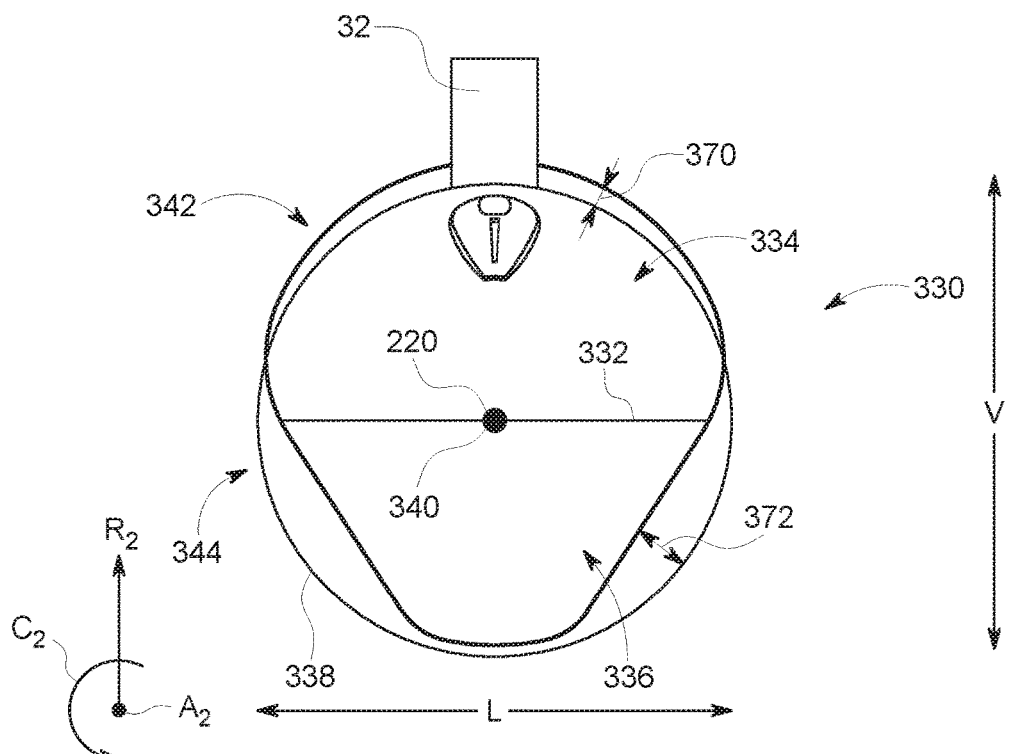
FIG. 8 provides a schematic cross-sectional view of the fuselage of the exemplary aircraft of FIG. 1, as taken along Line X-X of FIG. 5 according to another exemplary embodiment of the present subject matter.

Referring now to FIGS. 5 through 8, the shape of the aft end 16 of the exemplary aircraft 10 as well as features for providing improved boundary layer ingestion will be described in more detail. More specifically, FIGS. 5 and 6 provide schematic, cross-sectional side views of aft engine 200 mounted to fuselage 20. FIGS. 7 and 8 provide schematic cross-sectional views of fuselage, taken along the Line X-X in FIG. 5.

Referring specifically to FIG. 5, according to an exemplary embodiment, top side 202 of fuselage 20 defines a top surface 302 along which boundary layer air flows over aircraft 10. Similarly, bottom side 204 defines a bottom surface 304 along which boundary layer air flows over aircraft 10. As explained above, it is desirable to accelerate low velocity boundary layer airflow to improve propulsive efficiency. The features of the aircraft 10 described herein achieve these and other objectives.

According to the illustrated embodiment, top surface 302 defines a first point 310 located in a plane perpendicular to the longitudinal direction 12 and positioned at or aft of where leading edge 64 of vertical stabilizer 32 meets fuselage 20. In addition, top surface 302 defines a second point 312 located in a plane perpendicular to the longitudinal direction 12 downstream of first point 310. For example, second point 312 may be positioned at or forward of where trailing edge 66 of vertical stabilizer 32 meets fuselage 20. Top surface 302 also defines an upper inflection point 314 positioned between first point 310 and second point 312 along top surface 302 of fuselage 20. As illustrated, a first portion 316 of top surface 302 extends between first point 310 and upper inflection point 314 and a second portion 318 of top surface 302 extends between upper inflection point 314 and second point 312.

As illustrated in FIG. 5, first portion 316 is a convex curve when viewed looking down onto top surface 302 from outside of fuselage 20. In addition, second portion 318 is a concave curve when viewed looking down onto top surface 302 from outside of fuselage 20. In this regard, fuselage 20 generally defines a convex surface upstream a concave surface proximate aft engine 200. In this manner, boundary layer airflow may more effectively be distributed within aft engine 200. Thus, aft engine 200 may ingest a desired amount of slower moving boundary layer airflow and may discharge that low velocity air as relatively higher velocity air, thereby improving the propulsive efficiency of aircraft 10.

It should be appreciated that bottom surface 304 and any other surface located circumferentially around fuselage 20 proximate aft end 16 of fuselage 20 may have a similar profile as top surface 302. For example, bottom surface 304 defines a first point 320 located, for example, in the same plane as first point 310. In addition, bottom surface 304 defines a second point 322 located, for example, in the same plane as second point 312. It should be appreciated that first point 320 and second point 322 may alternatively be positioned at any suitable location along bottom surface 304 of fuselage 20. Bottom surface 304 also defines a lower inflection point 324 positioned between first point 320 and second point 322 along bottom surface 304 of fuselage 20. As illustrated, a convex first portion 326 of bottom surface 304 extends between first point 320 and lower inflection point 324 and a concave second portion 328 of bottom surface 304 extends between lower inflection point 324 and second point 322.

As illustrated, fuselage 20 defines upper inflection point 314 and lower inflection point 324 upstream of inlet 244 to aft engine 200. According to the illustrated embodiment, upper inflection point 314 and lower inflection point 324 are defined in the same plane between leading edge 64 of vertical stabilizer 32 and trailing edge 66 of vertical stabilizer 32. For example, upper inflection point 314 and lower inflection point 324 may be defined at a halfway point between leading edge 64 and trailing edge 66 of vertical stabilizer 32. However, it should be appreciated that upper inflection point 314 and lower inflection point 324 may be defined at any suitable location on fuselage 20. For example, upper inflection point 314 and lower inflection point 324 may be defined in a plane perpendicular to the longitudinal direction 12 that is three-quarters of the way along junction line 68 from leading edge 64 to trailing edge 66. In addition, upper inflection point 314 and lower inflection point 324 may be positioned at different locations along the longitudinal direction 12 (i.e., may be in different vertical planes). It should also be appreciated that the locations of upper inflection point 314 and lower inflection point 324 discussed herein are used only for explaining aspects of the present subject matter. Other locations and configurations of top surface 302 and bottom surface 304 of fuselage 20 are possible and within the scope of the present subject matter.

Referring still to FIG. 5, according to an exemplary embodiment, top surface 302 of fuselage 20 defines a tangent line 350 that extends parallel to top surface 302 and intersects a forward lip 246 of nacelle 224. According to the illustrated embodiment, tangent line 350 is defined where Line X-X intersects fuselage 20 (approximately halfway between leading edge 64 and trailing edge 66 of vertical stabilizer 32). However, other locations are possible. Notably, according to the illustrated embodiment, top surface 302 of fuselage 20 further defines a recessed portion 354 located at the aft end 16 just upstream of aft engine 200. Recessed portion 354 is defined where top surface 302 is indented inwardly toward fuselage 20 (i.e., towards the mean line 18 of the aircraft 10). However, because relatively higher velocity boundary layer air cannot track recessed portion 354 as easily as lower velocity air, the relatively higher velocity air continues along a trajectory defined by tangent line 350, thereby avoiding ingestion by aft engine 200.

It should be appreciated that the shape of fuselage 20 illustrated in FIG. 5 is only one exemplary fuselage 20 shape. According to alternative embodiments, fuselage 20 may be shaped in any manner suitable for optimizing the ingestion of boundary layer air. For example, referring to FIG. 6, fuselage 20 may define several regions along the aft end of fuselage 20, each region being concave, convex, or straight and having varying radii of curvature.

More specifically, according to the illustrated exemplary embodiment, fuselage 20 defines a first region 360 that extends along junction line 68 between leading edge 64 and a first point along junction line 68. First region 360 is convex, e.g., when viewed looking down onto top surface 302 from outside of fuselage 20. In addition, first region 360 may have a relatively large radius of curvature, i.e., first radius 361. According to an exemplary embodiment, first region 360 may further define an average angle along its length that is approximately ten degrees or less relative to longitudinal direction 12.

Fuselage 20 also defines a second region 362 that extends along junction line 68 between first region 360 and a second point along junction line 68. Second region 362 is also convex, e.g., when viewed looking down onto top surface 302 from outside of fuselage 20. Second region 362 may have a radius of curvature, i.e., second radius 363, which is relatively small compared to first radius 361. For example, according to one exemplary embodiment, the ratio of first radius 361 to second radius 363 may be 2:1, 3:1, 4:1, or greater. Furthermore, according to an exemplary embodiment, second region 362 may further define an average angle along its length that is approximately twenty degrees or less relative to longitudinal direction 12.

Fuselage 20 also defines a third region 364 that extends along junction line 68 from second region 362 towards end of junction line 68. For example, third region 364 may terminate at the end of junction line 68, or at any other location forward of fan 128. Third region 364 is concave and may have a radius of curvature, i.e., third radius 365, which is relatively large compared to second radius 363. For example, third radius 365 may be approximately the same as first radius 361. It should be appreciated that the regions described above are only used for the purpose of explaining aspects of the present subject matter. There may be fewer or more than three distinct regions, and each may be concave, convex, or have any suitable radius of curvature.

Now referring to FIGS. 7 and 8, two alternative cross-sectional views of fuselage 20 will be described according to exemplary embodiments of the present subject matter. Although the profiles used to describe the cross sections of fuselage are different, similar reference numerals will be used to describe them. It should also be appreciated that the cross sections discussed herein are used only for explaining aspects of the present subject matter and are not intended to be limiting in scope. The cross sectional profiles of fuselage 20 may vary along the length of fuselage 20 as desired depending on the particular application to improve the ingestion of boundary layer airflow into aft engine 200.

Referring now specifically to FIG. 7, a first cross section 330 will be described according to an exemplary embodiment of the present subject matter. According to the illustrated embodiment, cross section 330 may be taken along Line X-X of FIG. 5. However, it should be appreciated that cross section 330 may be located at any suitable location of fuselage 20 along the longitudinal direction 12. For example, cross section 330 may be defined at a halfway point between leading edge 64 and trailing edge 66 of vertical stabilizer 32. Alternatively, cross section 330 may be defined at a location along the longitudinal direction 12 that is three-quarters of the way along junction line 68 from leading edge 64 to trailing edge 66.

As illustrated, cross section 330 defines a horizontal reference line 332 that extends along the lateral direction L between the sides of cross section 330. In addition, horizontal reference line 332 extends through the central axis 220 of the aft engine 200 (see also FIG. 4). In this manner, horizontal reference line 332 defines a top half 334 of cross section 330 positioned above horizontal reference line 332 along the vertical direction V. In addition, horizontal reference line 332 defines a bottom half 336 of cross section 330 positioned below horizontal reference line 332 along the vertical direction V. Notably, according to the illustrated embodiment, a top half cross sectional area of top half 334 is greater than a bottom half cross sectional area of bottom half 336. In this manner, inlet 244 may be configured to capture a sufficient and uniform amount of the boundary layer air flowing over fuselage 20. For example, according to an exemplary embodiment, the top half cross sectional area of top half 334 may be at least about ten percent greater than the bottom half cross sectional area of bottom half 336.

As also illustrated in FIG. 7, fuselage 20 further defines a reference circle 338. Reference circle 338 is defined in the same plane as cross section 330, has a center point 340 that corresponds with central axis 220, and has a diameter equivalent to a length of horizontal reference line 332 or slightly longer (e.g., less than twenty percent longer) than a length of horizontal reference line 332. Cross section 330 defines a circumference 342 and reference circle 338 defines a circumference 344. According to the illustrated embodiment, at least a portion of the circumference 342 of top half 334 of cross section 330 is located outside reference circle 338. In addition, at least a portion of the circumference 342 of bottom half 336 of cross section 330 is located inside reference circle 338. In this manner, cross section 330 may generally be thicker or have a larger cross sectional area on top half 334 relative to bottom half 336. Cross section 330 may be designed to displace the boundary layer airflow to maximize the ingestion of low velocity air by the aft engine 200 and improve the propulsive efficiency of aircraft 10.

As illustrated in FIGS. 7 and 8, cross section 330 may be displaced from reference circle 338, such that fuselage 20 has an improved profile for boundary layer ingestion. The cross sectional profile may be similar for cross sections taken at other locations along the longitudinal direction 12 or may vary depending on the application. However, according to an exemplary embodiment, circumference 342 of cross section 330 is equivalent to circumference 344 of reference circle 338. In this manner, the surface drag along a fuselage shaped as cross section 330 may be substantially similar to the surface drag along a fuselage shaped as reference circle 338.

According to an alternative embodiment, horizontal reference line 332 extends across a widest portion of cross section 330 along the lateral direction L. In such an embodiment, horizontal reference line 332 may or may not intersect central axis 220. For example, as illustrated in FIG. 7, horizontal reference line 332 is positioned above central axis 220 along the vertical direction V. However, the circumference 342 of cross section 330 is once again constant. Such a configuration may be used to provide a more uniform flow distribution on boundary layer airflow circumferentially around fan inlet 244.

Referring again to FIG. 7, top half 334 of cross section 330 may have a maximum displacement 370 relative to reference circle 338. According to the illustrated embodiment, the point of maximum displacement 370 of top half 334 of cross section 330 is at approximately 45 degrees and 315 degrees about the circumferential direction relative to the vertical direction V. Similarly, bottom half 336 of cross section 330 may have a maximum displacement 372 relative to reference circle 338. According to the illustrated embodiment, the point of maximum displacement 372 of bottom half 336 of cross section 330 is at approximately 135 degrees and 225 degrees about the circumferential direction $C_2$ relative to the vertical direction V. It should be appreciated that these angles of maximum displacement are only approximates and may vary depending on the application. According to the illustrated embodiment, the maximum displacement 370 of top half 334 is equivalent to the maximum displacement 372 of bottom half 336.

As illustrated in FIG. 8, according to an exemplary embodiment, bottom half 336 of cross section may be tapered inward relative to reference circle 338. More specifically, as illustrated, each side of bottom half 336 is tapered along a substantially straight line between the seven o'clock and the nine o'clock positions along the circumferential direction C, relative to a vertical reference line (not shown). However, according to alternative embodiments, bottom half 336 may take any shape suitable for improving the amount of boundary layer air to enter aft engine 200.

An aircraft having a fuselage shaped in the manner described above and/or an aft engine configured in the manner described above may allow for capturing an optimal amount and distribution of a flow of boundary layer air from the fuselage. More specifically, the shaping of fuselage 20 results in a more uniform distribution of boundary layer airflow along the circumferential direction $C_2$ of the fuselage 20 and fan inlet 244. The velocity of the boundary layer air flowing into the aft engine 200 may be similar from top half 334 to bottom half 336, thus improving propulsive efficiency while reducing vibration, noise, and wear on the plurality of fan blades 228.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft defining a longitudinal direction, a vertical direction, and a lateral direction, the aircraft comprising:
   a fuselage extending between a forward end and an aft end along the longitudinal direction; and
   a boundary layer ingestion fan mounted to the fuselage at the aft end of the fuselage, the boundary layer ingestion fan defining a centerline and comprising a plurality of fan blades rotatable about the centerline and a nacelle surrounding the plurality of fan blades,
   wherein the fuselage defines a cross section upstream of the boundary layer ingestion fan, the cross section defining a horizontal reference line extending through the centerline of the boundary layer ingestion fan to define a top half having a top half cross sectional area and a bottom half having a bottom half cross sectional area, wherein the top half cross sectional area of the cross section is greater than the bottom half cross sectional area of the cross section.

2. The aircraft of claim 1, further comprising:
a stabilizer attached to the fuselage and extending between a leading edge and a trailing edge, and wherein the cross section is defined between the leading edge of the stabilizer and the trailing edge of the stabilizer.

3. The aircraft of claim 2, wherein the cross section is defined at a halfway point between the leading edge of the stabilizer and the trailing edge of the stabilizer.

4. The aircraft of claim 2, wherein the stabilizer is a vertical stabilizer.

5. The aircraft of claim 1, wherein the cross section of the fuselage defines a circumference, wherein the fuselage defines a reference circle at the cross section of the fuselage, wherein the reference circle defines a centerpoint at the centerline of the boundary layer ingestion fan, wherein at least a portion of the circumference of the top half of the cross section of the fuselage is located outside the reference circle, and wherein at least a portion of the circumference of the bottom half of the cross section of the fuselage is located inside the reference circle.

6. The aircraft of claim 5, wherein a circumference of the reference circle is substantially the same as the circumference of the cross section.

7. The aircraft of claim 1, wherein a maximum displacement of the top half of the cross section relative to the reference circle is equivalent to a maximum displacement of the bottom half of the cross section relative to the reference circle.

8. The aircraft of claim 7, wherein the maximum displacement of the top half of the cross section relative to the reference circle and the maximum displacement of the bottom half of the cross section relative to the reference circle are positioned at approximately 45 degrees and 135 degrees from the vertical direction, respectively.

9. The aircraft of claim 1, wherein a top surface of the fuselage defines a tangent line at the cross section, the tangent line intersecting a forward lip of the nacelle.

10. The aircraft of claim 2, wherein a top surface of the fuselage defines:
a first point located in a plane perpendicular to the longitudinal direction, wherein the first point is positioned at or aft of where the leading edge of the stabilizer meets the fuselage;
a second point located in a plane perpendicular to the longitudinal direction and positioned at or forward of where the trailing edge of the stabilizer meets the fuselage;
an upper midpoint;
a first portion of the top surface, the first portion extending between the first point and the upper midpoint, the first portion being convex and having a first radius of curvature; and
a second portion of the top surface, the second portion extending between the upper midpoint and the second point, the second portion being convex and having a second radius of curvature, the second radius of curvature being smaller than the first radius of curvature.

11. The aircraft of claim 10, wherein the upper midpoint is located on the top surface of the fuselage approximately at a halfway point between the leading edge of the stabilizer and the trailing edge of the stabilizer.

12. The aircraft of claim 2, wherein a bottom surface of the fuselage defines:
a first point located in a plane perpendicular to the longitudinal direction, wherein the first point is positioned at or aft of where the leading edge of the stabilizer meets the fuselage;
a second point located in a plane perpendicular to the longitudinal direction and positioned at or forward of where the trailing edge of the stabilizer meets the fuselage:
a lower midpoint;
a first portion of the bottom surface, the first portion extending between the first point and the lower midpoint, the first portion being convex and having a first radius of curvature; and
a second portion of the bottom surface, the second portion extending between the lower midpoint and the second point, the second portion being convex and having a second radius of curvature, the second radius of curvature being smaller than the first radius of curvature.

13. The aircraft of claim 12, wherein the lower midpoint is located on the bottom surface of the fuselage approximately at a halfway point between the leading edge of the stabilizer and the trailing edge of the stabilizer.

14. An aircraft defining a longitudinal direction, a vertical direction, and a lateral direction, the aircraft comprising:
a fuselage extending between a forward end and an aft end along the longitudinal direction, the fuselage defining a top surface and a bottom surface; and
a boundary layer ingestion fan mounted to the fuselage at the aft end of the fuselage, the boundary layer ingestion fan defining a centerline and comprising a plurality of fan blades rotatable about the centerline and a nacelle surrounding the plurality of fan blades,
wherein the fuselage defines a cross section upstream of the boundary layer ingestion fan, the cross section defining a circumference and a horizontal reference line, wherein the horizontal reference line extends across a widest portion of the cross section along the lateral direction, the fuselage further defining a reference circle at the cross section and having the horizontal reference line as a diameter of the reference circle, wherein at least a portion of the circumference at a top half of the cross section of the fuselage is located outside the reference circle, and wherein at least a portion of the circumference at a bottom half of the cross section of the fuselage is located inside the reference circle.

15. The aircraft of claim 14, further comprising:
a stabilizer attached to the fuselage and extending between a leading edge and a trailing edge, and wherein the cross section is defined between the leading edge of the stabilizer and the trailing edge of the stabilizer.

16. The aircraft of claim 14, wherein a circumference of the reference circle is substantially the same as the circumference of the cross section.

17. The aircraft of claim 14, wherein a top surface of the fuselage defines a tangent line at the cross section, the tangent line intersecting a forward lip of the nacelle.

* * * * *